June 28, 1955   C. A. REIMSCHISSEL   2,711,548
CHASER MOUNTING
Filed May 25, 1950   2 Sheets-Sheet 1
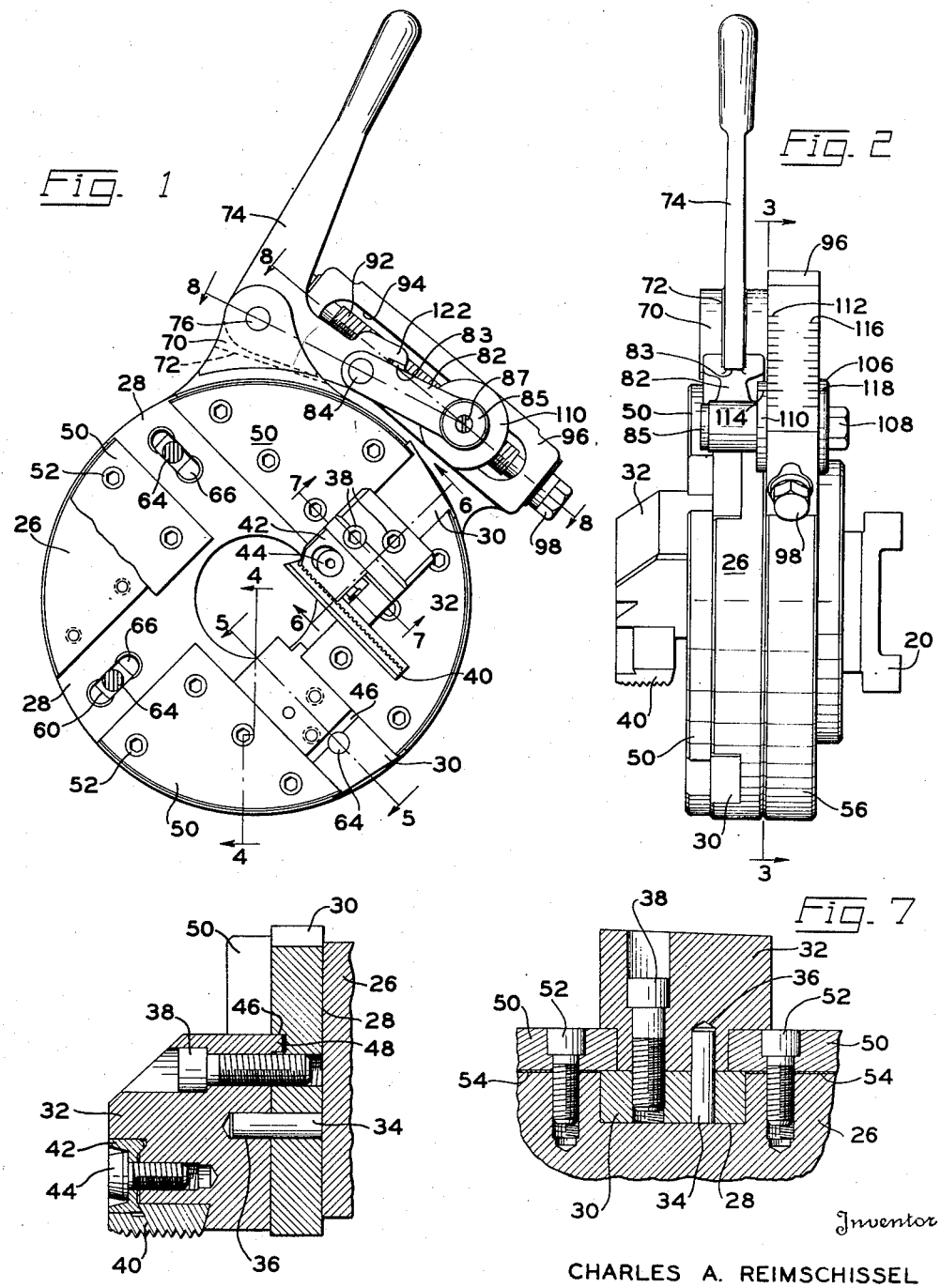
Inventor
CHARLES A. REIMSCHISSEL
By Strauch, Nolan & Diggins
Attorneys June 28, 1955  C. A. REIMSCHISSEL  2,711,548
CHASER MOUNTING
Filed May 25, 1950  2 Sheets-Sheet 2
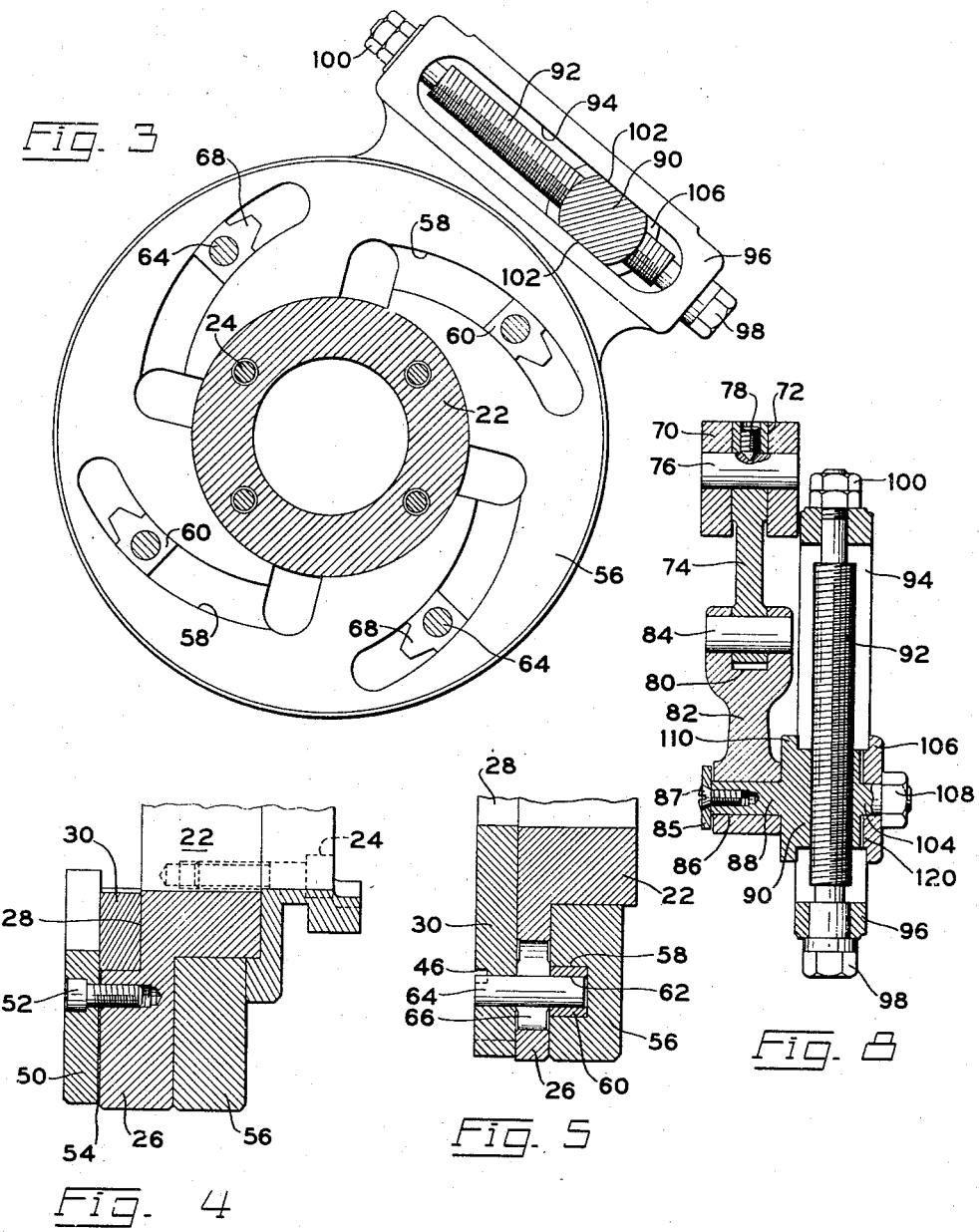
Inventor
CHARLES A. REIMSCHISSEL
By Strauch, Nolan & Diggins
Attorneys

United States Patent Office 2,711,548
Patented June 28, 1955

2,711,548

CHASER MOUNTING

Charles A. Reimschissel, Waynesboro, Pa., assignor to Landis Machine Company, Waynesboro, Pa., a corporation of Pennsylvania Application May 25, 1950, Serial No. 164,106

1 Claim. (Cl. 10—104)

This invention relates to apparatus for cutting threads and more particularly to die heads for cutting threads on pipe, tubing and other cylindrical stock.

Die heads generally may be divided into two classes, namely, those which rotate while cutting a thread on a stationary work piece and those which are held in non-rotating position while threading a rotating work piece. The die head embodying the improvements of my invention, as shown and described herein, is of the latter type although it is well known that certain features of the stationary die head may be used in the rotating die head and vice versa.

Die heads intended primarily for threading pipe fall generally into two further classes: Those employed by the large steel mills and manufacturers of pipes and tubes and those employed by the small jobber, a plumber and plumbing supply house. Those of the first class are required to be extremely accurate in operation and to have every possible compensation for wear which rapidly develops in continuous operation at a high rate of production. In this field, also, the first cost of the die head is permitted to be rather high because mass production distributes this cost over a very large number of finished products. In die heads of the second class, however, first cost is a prime consideration and consequently accuracy and wear-resisting qualities have, in prior constructions, been sacrificed to the end of reducing the expense of manufacturing the die head.

It has long been recognized as desirable to incorporate the advantages of die heads of the first or pipe mill class, as typified by that shown and described in my prior United States Patent 2,387,294, issued October 23, 1945, in die heads of the second or jobbing class, as typified by the United States patent to Glaspey et al. 1,569,740, issued January 12, 1926, with the purpose of increasing the accuracy and prolonging the period of efficient service of the latter while maintaining its versatility and low cost.

Among such desirable features is that of detachably mounting the chaser holders on slides, whose function is chiefly the movement of the chasers radially both into and out of proper thread cutting position, while the chaser holder supports the chaser at the proper angle for cutting the thread. The chaser holders may thus be exchanged, for cutting threads of various helix angles without, at the same time, exchanging sliding members. All thread sizes within the range of the die head may therefore be cut with the same sliding members, thus avoiding the varying sliding action which would result from different degrees of wear on the sliding members if they were exchanged integrally with the chaser holders. It is, of course, recognized that the connection between sliding member and chaser holder must be exceptionally rigid, permitting no relative movement in any direction. In prior constructions of this sort, the necessary rigidity has been obtained by providing, on both members, interfitting ledges having extremely close tolerances, resulting in a relatively high production cost. I have provided a novel connection between these parts which is at once perfectly rigid, simple to manufacture and quite inexpensive.

Another advantage present in the die head of my invention and heretofore available only in the most complex and expensive die heads is that of locating the thread-cutting chasers at the front face of the die head, close to the surfaces which absorb the cutting forces. This construction also involves the use of holding plates or gibs by which compensation may easily be made for the natural wear of the radially-moving sliding members.

In such die heads which employ a scroll-type slotted cam ring for actuating the chaser holder slides when the head is opening and closed, it is recognized as preferable to employ a substantially square block with curved sides as a cam follower instead of a simple cylindrical roller. This is to avoid the single line contact of the roller and the consequent indentations in the sides of the cam grooves or slots caused by the cutting forces. In prior constructions, however, the block type follower has had the disadvantage of sticking in the concave closed end of the groove. I have devised a novel cam follower which has the advantages of the block and which cannot possibly bind in the end of the groove.

It is an object of my invention to provide an improved thread cutting die head which is simple in construction and low in cost and which comprises mechanisms having a degree of accuracy, rigidity and compensation for wear heretofore obtained only at greatly increased cost.

It is another object of the invention to provide a novel and simple means of rigidly but detachably joining the chaser holders to the sliding members by means which prevents all relative motion between said respective members.

It is a further object to locate and mount the chaser carrying members in a novel, efficient and economical manner for maximum acessibility and rigid support.

It is a still further object of the invention to provide plates or gibs of novel and economical construction in a die head of the above described general type, to retain the chaser holders thereon and absorb cutting forces and for the purpose of compensating for the effects of normal wear.

Another object is to provide cam follower members for such a die head which are of novel construction to provide maximum bearing surface and prevent binding in the coacting cam member.

Other objects and advantages of the improved die head combination of my invention will be apparent from the following description thereof in connection with the accompanying drawings.

In the drawings:

Figure 1 is a front face elevation of the die head,

Figure 2 is a side elevation thereof,

Figure 3 is a vertical sectional view taken substantially along line 3—3 of Figure 2, Figure 4 is a fragmentary sectional view taken along line 4—4 of Figure 1, Figure 5 is a fragmentary sectional view taken along line 5—5 of Figure 1, Figure 6 is a fragmentary sectional view taken along line 6—6 of Figure 1, Figure 7 is a fragmentary sectional view taken along line 7—7 of Figure 1 and Figure 8 is a fragmentary sectional view taken alnog line 8—8 of Figure 1.

The die head is adapted to be mounted in operating position on the cross slide of a conventional type of pipe threading or other similar machine. It is well known that in such machines the die head is non-rotating and, together with the cross rail, moves longitudinally relative to the rotating work piece. The attaching member 20 (Fig. 2) is formed so as to be laterally slidable on the said cross rail and thus supports the die head in proper operative position. A head body 22, which is the principal member of the die head, is secured to attaching member 20 by means of screws 24 (Figs. 3 and 4). At its forward end, head body 22 is provided with a flanged portion 26 which is formed in its forwardly facing surface with a plurality of rectangular grooves 28. These grooves 28, as shown in Figs. 1 and 7 provide slideways which receive an equal number of sliding members 30.

Chaser holders 32 are accurately located upon slides 30 by means of pins 34 which are press fitted in suitable bores in slides 30 and extend forwardly therefrom into aligned openings 36 in the chaser holders 32. Screws 38 secure chaser holders 32 to slides 30 and prevent relative movement therebetween in a direction axially of the die head. Thread cutting chasers 40 are adjustably maintained in proper operating position on chaser holders 32 by means of clamps 42 and clamping screws 44 substantially in the manner shown and described in United States Patent No. 2,239,735, issued April 29, 1941. For illustrative purposes, only one chaser holder 32 and only two slide members 30 are shown in Figure 1, it being understood that one of each of these members is provided for each of the slideways 28. Each slide 30 is provided with a rectangular groove 46 in its forward surface, which groove is disposed at right angles to the side edges of the slide or, in other words, substantially perpendicular to the path of sliding movement of slide 30. A rectangular flange portion 48 is formed upon the rearward surface of each chaser holder 32 to closely engage in each of the grooves 46. By means of this rigid tongue-and-groove connection, slides 30 and chaser holders 32 are prevented from moving relatively to each other in a direction perpendicular to the axis of the die head.

The division of each chaser supporting and moving member into a sliding member, such as a slide 30, and a supporting member, such as a chaser holder 32, permits a chaser holder 32 to be replaced by another suitable for cutting a different thread without changing the sliding fit existing between the slide 30 and slideway 28. I have eliminated the expensive and difficult-to-machine cross-key construction previously employed for the purpose of maintaining the substantially integral relationship between these parts, without sacrificing any of the rigidity of the tool which is essential to the cutting of accurate threads.

The assemblies comprising chasers 40, chaser holders 32 and slides 30 are maintained in correct position axially of the die head by means of a plurality of substantially quadrant-shaped plates or gibs 50 which are secured by means of screws 52 to the forward surface of head body portion 26. As seen in Figures 1 and 7, each of the gibs 50 projects laterally over one side of the two adjacent slideways 28. Thus each slide 30 is retained in its groove 28 by the opposed side edge portions of two adjacent gibs 50. As also shown in Figure 7, the chaser holders 32 extend laterally upon the top surfaces of adjacent gibs 50 which serve as additional supporting surface to absorb the thrust forces incident to the cutting operation. Shims 54 may be inserted between gibs 50 and head body portion 26 when the slides 30 are new, and may be removed as wear occurs on slides 30 to maintain the desired neat fit between slides 30 and the members enclosing them. It should also be noted that the slideways 28 are offset laterally from a true radial line to permit the cutting edges of the chasers 40 to be set on the radial line for optimum cutting conditions, although this precise setting may be varied as differences in material, etc. may require.

On the rearwardly extending portion of head body 22 a cam ring 56 is mounted for rocking movement relative to head body 22. Cam ring 56, as seen in Figure 3 is provided with a plurality of spiral cam grooves 58, one for each chaser holder-slide assembly. Cam grooves 58 are substantially rectangular in cross-section (Fig. 5) and each receives a sliding block or cam follower 60. Each cam follower 60 is provided with a bore 62 and a pin 64 is embedded in the slide 30 and extends rearwardly therefrom through a radially elongated slot 66 in the bottom wall of slidaway 28, into a bore 62 in cam follower 60. The forward end of pin 64 partially intersects groove 46 in the slide and tongue or flange 48 on the chaser holder 32 is notched to accommodate this pin.

In this manner, when the parts of the die head are at rest, the assemblies comprising chasers 40, chaser holders 32 and slides 30 are maintained in the desired radial position. To prevent any undesirable radial movement of the chasers 40, the cam followers 60 are formed to fit precisely between the sides of the cam grooves 58. When the cam ring 56 is rocked in the counterclockwise direction, as seen in Figure 3, the camming action between cam grooves 58 and cam followers 60 increases the distance between the center of the die head and the centers of said followers and the chaser-chaser holder-slide assemblies are moved radially away from the center of the die head by pins 64. Such movement, of course, is employed when it is desired to withdraw the chasers 40 from a finished thread for removal of the threaded part. It is the purpose of slots 66 in head body portion 26 to permit such movement of pins 64. To close the die head to cutting position, rotation of the cam ring 56 is reversed.

It has been recognized that cam followers such as those designated at 60, that is, having surfaces engaging the sides of cam grooves 58 over a substantial area are superior to cam followers of the roller type which would engage the sides of the cam grooves along one line only and which consequently form indentations at those points along the cam grooves at which they are located during cutting operations, thus permitting radial movement of the chasers during cutting and adversely affecting the accuracy of the thread. The disadvantage of such surface-contact followers have been their tendency to bind in the semi-circular terminal portions of the grooves. This disadvantage I have eliminated by providing each of the followers 60, on its side adjacent the semi-circular end of groove 58, with a protruding portion 68 which strikes the extreme end of the slot before the corners of the follower body can bind on the side walls of the groove.

Referring now to Figures 1, 2 and 8, it will be seen that head body portion 26 is provided with an integral lug 70. Lug 70 is bifurcated by a slot 72 to receive a bell crank lever 74 which is pivotally mounted in said slot on a pin 76 rockably supported in the sides of lug 70. A set screw 78, threadedly engaged in lever 74 and extending into pins 76, effectively keys these parts for unitary rotation. One arm of lever 74 provides a handle for manual operation of the die head while the other arm enters a slot 80 in one end of a link 82 and is pivotally connected to said link 82 by means of a pin 84 which is supported by link 82 at opposite sides of slot 80. The other end of link 82 is formed with a bore 86 through which extends the reduced cylindrical extension 88 of an adjusting nut 90. Link 82 is retained upon extension 88 by means of a suitable washer 85 and a screw 87 which passes through said washer and its threadedly engaged in the end of extension 88.

Transversely to extension 88, adjusting nut 90 is internally threaded to engage a screw 92 which is passed therethrough. Screw 92 is journalled at both ends, for roation, in the opposite end walls of an elongated slot 94 in a lug 96, which preferably is integrally formed upon the periphery of cam ring 56 in radially projecting relation therefrom. A head 98 at one end and a pair of lock nuts 100 at the opposite end of screw 92 permit rotation of said screw but prevent axial movement thereof.

As seen in Figures 3 and 8, adjusting nut 90 extends substantially through the slot 94 in a transverse direction and is adapted to be moved from one end of the slot to the other, by virtue of its threaded engagement with the screw 92 upon rotation of the latter. Adjusting nut 90 is guided in slot 94 by flat sides 102 which are formed thereon to engage closely the sides of said slot. Another portion 104 of adjusting nut 90 extends rearwardly from slot 94 and has mounted thereon a washer 106 and nut 108. These parts, together with a flange portion 110 integral with adjusting nut 90 at the forward side of slot 94, prevent movement of said nut transversely of the slot 94. The adjustment of adjusting nut 90 along slot 94 may be measured by the cooperation of a scale 112 engraved along the forward edge of the top of lug 96 and an index line 114 on the circumference of flange portion 110. If desired, a scale 116 engraved along the rearward edge of the top of lug 96 and an index line 118 on the circumference of washer 106, may alternatively be used. It may be found convenient to employ both scales 112 and 116, one, for example, for pipe sizes and the other for bolt sizes. The washer 106 having the index line 118 must not be permitted to rotate and thus displace line 118 and to this end a portion 120 of washer 106 extends (Fig. 8) into slot 94 and is keyed thereby.

It will be seen that rotation of screw 92 relative to adjusting nut 90 when the die head is closed will rock cam ring 56 relative to head body 22 by changing the relative positions of lug 96 on said cam ring and lug 70 on said head body. Rocking of cam ring 56 as above described thus moves the chasers 40 radially toward or from the center of the die head to initially adjust said chasers to the desired diametrical cutting position. In closed or thread cutting position, the die head appears as shown in Figure 1, with a substantially straight-line relationship existing between the centers of pins 76 and 84 and extension 88 so that the cam ring cannot rock in response to cutting pressures. This position is maintained by a protuberance 122 on the arm of lever 74 connected to link 82, which protuberance strikes a pad 83 on link 82 and prevents further rotation of lever 74. To open the die head, lever 74 is rotated in the counterclockwise direction as seen in Figure 1, thus drawing the centers of pin 76 and extension 88 closer together and rocking the cam ring 56 in the counterclockwise direction to cause the chasers 40 to be withdrawn from the work piece.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by the United States Letters Patent is:

In a die head, a head body having a slideway in its front face, a slide slidably mounted in said slideway, said slide having a recess on its outer face normal to the path of its sliding movement, a locater pin press-fitted into said slide and projecting axially outwardly therefrom, spaced gib plates secured to said front face of said body member for retaining said slide in assembled relation in said slideway, a chaser holder detachably assembled on said pin on said slide and having a flange received within said recess in said outer face of said slide whereby said locater pin absorbs lateral thrust forces and said recess absorbs radial thrust forces, said chaser holder having an integral portion extending between said gib plates with a sliding fit and other portions adapted to contact the outer faces of said gib plates to directly transmit cutting forces thereto.

References Cited in the file of this patent

UNITED STATES PATENTS

| Number | Name | Date |
|---|---|---|
| 949,031 | Borden | Feb. 15, 1910 |
| 1,389,731 | Barker | Sept. 6, 1921 |
| 1,758,973 | Rasmussen | May 20, 1930 |
| 1,924,735 | Bysshe et al. | Aug. 29, 1933 |
| 1,951,291 | Reimschissel et al. | Mar. 13, 1934 |
| 2,103,074 | Gardner | Dec. 21, 1937 |
| 2,108,149 | Strickland | Feb. 15, 1938 |
| 2,119,984 | Breitenstein | June 7, 1938 |
| 2,266,508 | Pealer | Dec. 16, 1941 |
| 2,291,758 | Reimschissel | Aug. 4, 1942 |
| 2,350,313 | Ingwer et al. | May 30, 1944 |
| 2,387,294 | Reimschissel | Oct. 23, 1945 |
| 2,499,971 | Reimschissel | Mar. 7, 1950 |